US009334846B2

(12) United States Patent
Anton

(10) Patent No.: US 9,334,846 B2

(45) Date of Patent: May 10, 2016

(54) METHOD AND SYSTEM OF CONTROLLING BANK TO BANK COMPONENT TEMPERATURE PROTECTION DURING INDIVIDUAL CYLINDER KNOCK CONTROL

(71) Applicant: Ford Global Technologies, LLC, Dearborn, MI (US)

(72) Inventor: Richard J. Anton, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 308 days.

(21) Appl. No.: 14/175,816

(22) Filed: Feb. 7, 2014

(65) Prior Publication Data

US 2015/0226172 A1 Aug. 13, 2015

(51) Int. Cl.
*F02P 5/04* (2006.01)
*F02P 5/152* (2006.01)

(52) U.S. Cl.
CPC ............... *F02P 5/045* (2013.01); *F02P 5/1522* (2013.01); *Y02T 10/46* (2013.01)

(58) Field of Classification Search
CPC ............... F02P 5/04; F02P 5/045; F02P 5/00; F02P 5/1522; Y02T 10/46
See application file for complete search history.

(56) References Cited

U.S. PATENT DOCUMENTS 4,376,429 A 3/1983 Youngblood
4,433,654 A * 2/1984 Yokooku ............... F02P 5/1528 123/406.34
4,509,331 A * 4/1985 Hirabayashi .......... F02P 5/1528 123/406.35
4,612,902 A 9/1986 Abe et al.
4,676,212 A 6/1987 Kashimura et al.
5,014,669 A * 5/1991 Takasaki ............... F02P 5/1553 123/406.55
5,626,117 A 5/1997 Wright et al.
8,267,066 B2 * 9/2012 Surnilla ................ F02D 35/027 123/406.29

FOREIGN PATENT DOCUMENTS

EP 1223319 A1 7/2002
EP 1574691 A2 9/2005
FI WO 2013026949 A1 * 2/2013 ............ F02D 35/027
WO 2011023852 A1 3/2011
WO 2013118151 A2 8/2013

* cited by examiner

*Primary Examiner* — Hieu T Vo
(74) *Attorney, Agent, or Firm* — Julia Voutyras; Alleman Hall McCoy Russell & Tuttle LLP

(57) ABSTRACT

Methods and systems are provided for improved component temperature protection during individual cylinder knock control. Cylinder spark adjustments may be performed individually based on respective cylinder adaptive knock estimates. Bank to bank engine fueling may then be performed to control the exhaust temperature of each engine bank, independently.

20 Claims, 3 Drawing Sheets

ROM
CPU
RAM
KAM
I/O
FUEL SYSTEM
IGNITION SYSTEM
DRIVER
PP
MAF
TP
MAP
PIP
EGO
SA
FPW
ECT

METHOD AND SYSTEM OF CONTROLLING BANK TO BANK COMPONENT TEMPERATURE PROTECTION DURING INDIVIDUAL CYLINDER KNOCK CONTROL

FIELD

The present application relates to systems and methods for improved component temperature protection during individual cylinder knock control.

BACKGROUND/SUMMARY

Ignition timing of an internal combustion engine may be varied in accordance with engine operating conditions so as to provide optimum engine operation. As an example, for increased engine efficiency and reduced fuel consumption, spark timing for each cylinder may be positioned at minimum spark advance for best torque (MBT). Ignition timing may then be retarded from the optimum timing in response to abnormal combustion events, such as due to knocking. One example approach is shown by Haraldson et al in WO 2011023852. Therein, cylinder-to-cylinder knock control is performed by controlling detonation in each cylinder via independent adjustments to the spark timing of each cylinder.

However, the inventors herein have recognized potential issues with such an approach. While cylinder-to-cylinder knock control allows knock to be addressed more reliably, the exhaust temperature of each cylinder can vary drastically with spark retard (or advance) from other cylinders in the respective bank, as well as between banks (such as in a V-engine). When operating near component temperature limits, such as temperature limits of an exhaust catalyst, an exhaust turbine inlet, one or more exhaust valves, etc., if one or more cylinders has spark retarded from a base value of spark, the exhaust temperatures in those cylinders may exceed design limits. As such, this can reduce the engine's life and increase the need for component replacement. Component temperatures may be controlled by increasing/decreasing fuel delivery across all cylinders of a whole bank (e.g., in an I-engine) or both banks (e.g., in a V-engine). For example, fueling of all cylinders of the engine may be adjusted based on an inferred global engine temperature model with global modifiers for spark and lambse to further predict the change in exhaust temperature for each cylinder. However, this may lead to excess fuel wastage and overall reduced fuel economy and engine performance.

In one example, some of the above issues may be addressed by a method for an engine that enables individual cylinder knock control while maintaining component temperatures within limits with reduced fuel wastage. One example method comprises: maintaining engine exhaust temperature within a threshold via each of spark and fueling adjustments, the spark adjustment based on adaptive knock control values for each of a plurality of engine cylinders, the fueling adjustment based on the spark adjustment.

For example, adaptive knock values may be learned for each cylinder individually, over multiple drive cycles, based on knock occurrences in each cylinder. Based on each cylinder's adaptive knock value, each cylinder may be operated with a different amount of spark retard from MBT. For example, cylinders with a higher propensity for knock may have higher knock adaptive values and may be operated with spark timing retarded further from MBT, while cylinders with a lower propensity for knock may have lower knock adaptive values and may be operated with spark timing less retarded from MBT (e.g., with no spark retard, with spark at MBT, or with spark advanced from MBT). Cylinder fueling may then be adjusted bank to bank based on the learned spark adjustments to enable bank-specific exhaust temperature control. Specifically, for each bank, a cylinder having the largest amount of spark retard may be identified. Fueling of all cylinders of that bank may then be adjusted based on the largest amount of spark retard so as to maintain an exhaust temperature of the given bank below a threshold. As an example, all cylinders of the bank may be enriched based on the largest amount of spark retard. Likewise, spark of cylinders of the other engine bank (such as in a V-engine) may be adjusted based on respective adaptive values while fueling is adjusted based on the cylinder with the largest amount of spark retard. Alternatively, the cylinder with the largest amount of spark retard may be fueled based on the largest amount of spark retard to enable exhaust temperatures to be controlled while fueling of the remaining cylinders of another given bank may be adjusted based on the determined fueling so as to maintain an exhaust air-fuel ratio of the given bank at or around stoichiometry, or any base commanded air-fuel ratio (such as Wide Open Pedal performance—Leanest for Best Torque (LBT)).

In this way, cylinder-to-cylinder knock control can be achieved while compensating for differences in exhaust heat generation due to differential spark adjustment of cylinders. By adjusting cylinder fueling based on the spark modifier of the worst case cylinder, a more accurate prediction of exhaust temperature rise due to spark adjustment can be provided. By fueling all cylinders of an engine bank based on the spark modifier of the cylinder with the largest amount of spark retard (the worst case cylinder), it may better ensured that any cylinder or bank does not exceed temperature limits of engine components. Thus, exhaust temperature control is improved. By calculating the amount of fuel to be added to each engine bank based on a fuel modifier adjusted for exhaust temperature, temperature and knock control can be achieved without wasting fuel. As such, this improves overall engine fuel economy and engine performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
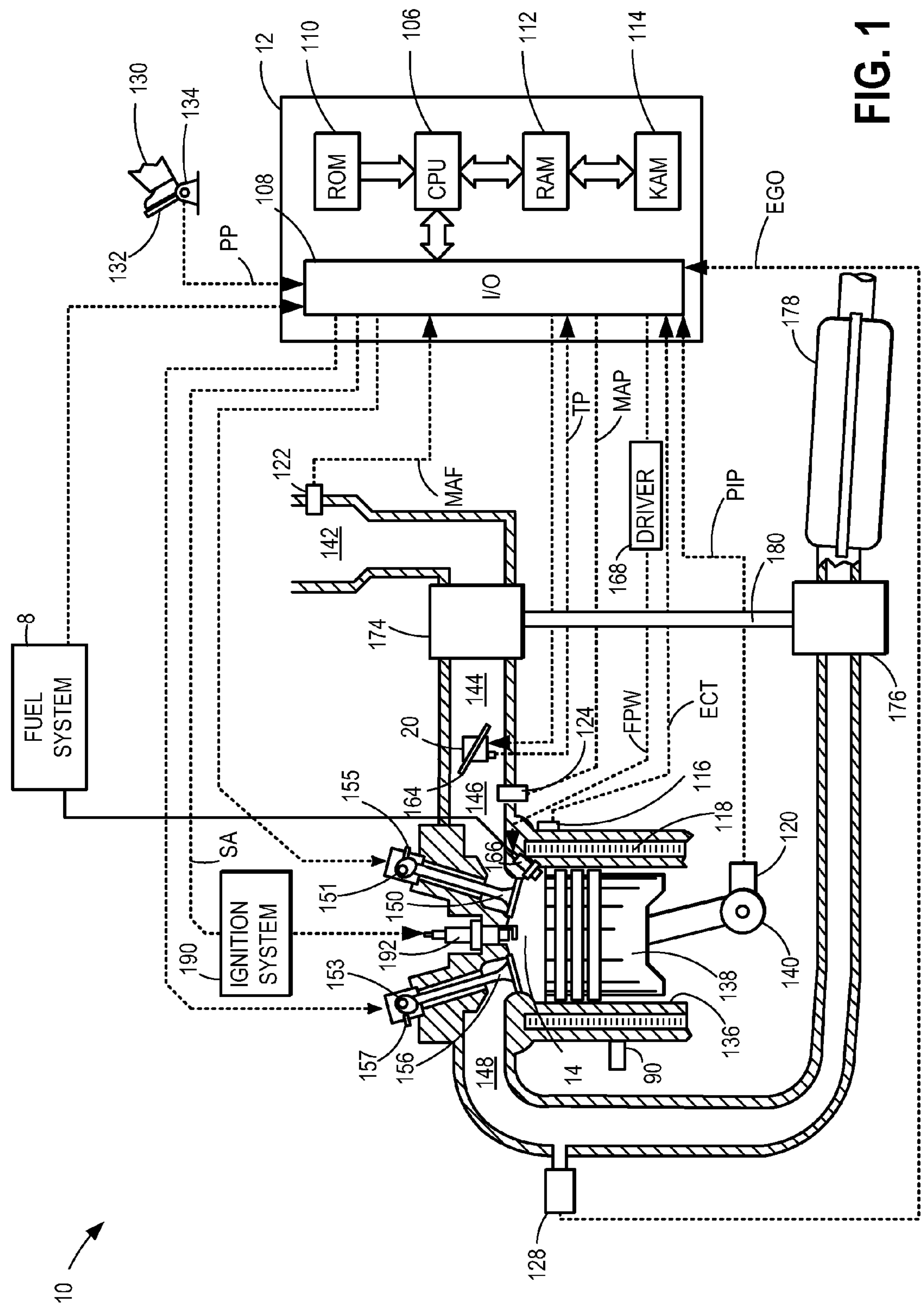
FIG. 1 shows a partial engine view.

Methods and systems are provided for knock control in an engine system, such as the engine system of FIG. 1, while also maintaining an exhaust temperature within component design limits. A controller may be configured to perform a control routine, such as the routine of FIG. 2, to adjust spark modifiers for each cylinder based on individual adaptive knock values while adjusting fuel modifiers for each cylinder of an engine bank globally based on the spark retard of the worst case cylinder. By adjusting bank fueling based on an exhaust temperature rise associated with the cylinder having the largest amount of spark retard, exhaust temperature may be maintained within component design limits without wasting excess fuel. An example adjustment is shown with reference to FIG. 3.

FIG. 1 depicts an example embodiment of a combustion chamber or cylinder of an internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber') 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT, as shown in FIG. 1), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used.

Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two injectors (for example, a direct injector and a port injector) and varying a relative amount of injection from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen (for lean mixtures) or unburned hydrocarbons (for rich mixtures) in the exhaust gas, the sensor may determine the AFR. As such, the AFR may be provided as a Lambda ($\lambda$) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 1 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Engine 10 may further include a knock sensor 90 coupled to each cylinder 14 for identifying abnormal cylinder combustion events. In alternate embodiments, one or more knock sensors 90 may be coupled to selected locations of the engine block. The knock sensor may be an accelerometer on the cylinder block, or an ionization sensor configured in the spark plug of each cylinder. The output of the knock sensor may be combined with the output of a crankshaft acceleration sensor to indicate an abnormal combustion event in the cylinder, such as to identify knock occurrence in one or more cylinders. As an example, knock may be indicated in response to knock sensor signals that are generated in a window occurring after a cylinder spark event. In addition, knock may be indicated in response to knock sensor output signals that are higher than a threshold in intensity and occurring with more than a threshold frequency.

In response to an indication of knock, a mitigating action may be applied. For example, knock may be addressed using spark retard and/or EGR. For example, spark timing may be retarded from MBT as a knocking intensity increases. In addition, each cylinder's propensity for knock may be learned and used to update an adaptive knock value table, as elaborated at FIG. 2. As a frequency of knock occurrence in a cylinder increases, the adaptive knock control value of the cylinder may be increased. Further, as the adaptive knock value for the cylinder increases, the spark adjustment of the cylinder may include spark timing being retarded further from MBT. The adaptive knock value, and related spark multiplier, learned during an engine cycle (or vehicle drive cycle) may then be used to adjust spark timing in the cylinder during a subsequent engine cycle (or vehicle drive cycle) as part of feed-forward knock control (before a knock event occurs).

Thus, each cylinder's adaptive knock value is learned independently, and each cylinder is operated with a different amount of spark retard from MBT. That is, there may be uneven spark retard among the cylinders. Since the amount of spark retard affects the amount of exhaust heat generated in the cylinder, the uneven spark retard may cause some cylinders (such as those with higher knock propensity and therefore higher spark retard) to generate more heat than others. To allow exhaust heat temperatures in the engine, or engine bank, to be maintained within component design limits, fueling of all cylinders of the engine, or engine bank, may be adjusted based on the cylinder with the largest amount of spark retard, as elaborated at FIG. 2. That is, based on the "worst case" cylinder. In particular, an exhaust heat temperature rise associated with the largest amount of spark retard in the cylinder with the highest adaptive knock value may be predicted. A fueling adjustment (e.g., enrichment) may then be determined based on the predicted temperature rise so that the exhaust temperature of the bank can be maintained below a threshold temperature. All cylinders of the given engine bank may then be fueled similarly, with a common degree of richness based on the largest amount of spark retard of the worst case cylinder.

Returning to FIG. 1, Controller 12 is shown as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from knock sensor 90 and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. An example routine is with reference to FIG. 2.

In this way, the system of FIG. 1 enables a method for maintaining engine exhaust temperature within a threshold via each of spark and fueling adjustments, wherein the spark adjustment is based on adaptive knock control values for each of a plurality of engine cylinders, and the fueling adjustment is based on the spark adjustment. By differentially retarding spark ignition timing in a plurality of engine cylinders based on adaptive knock control values of respective cylinders, and then adjusting fuel injection to each of the plurality of cylinders based on ignition timing of only one of the plurality of cylinders having a largest amount of spark retard, an exhaust temperature may be maintained below a threshold temperature.

Figure 2:
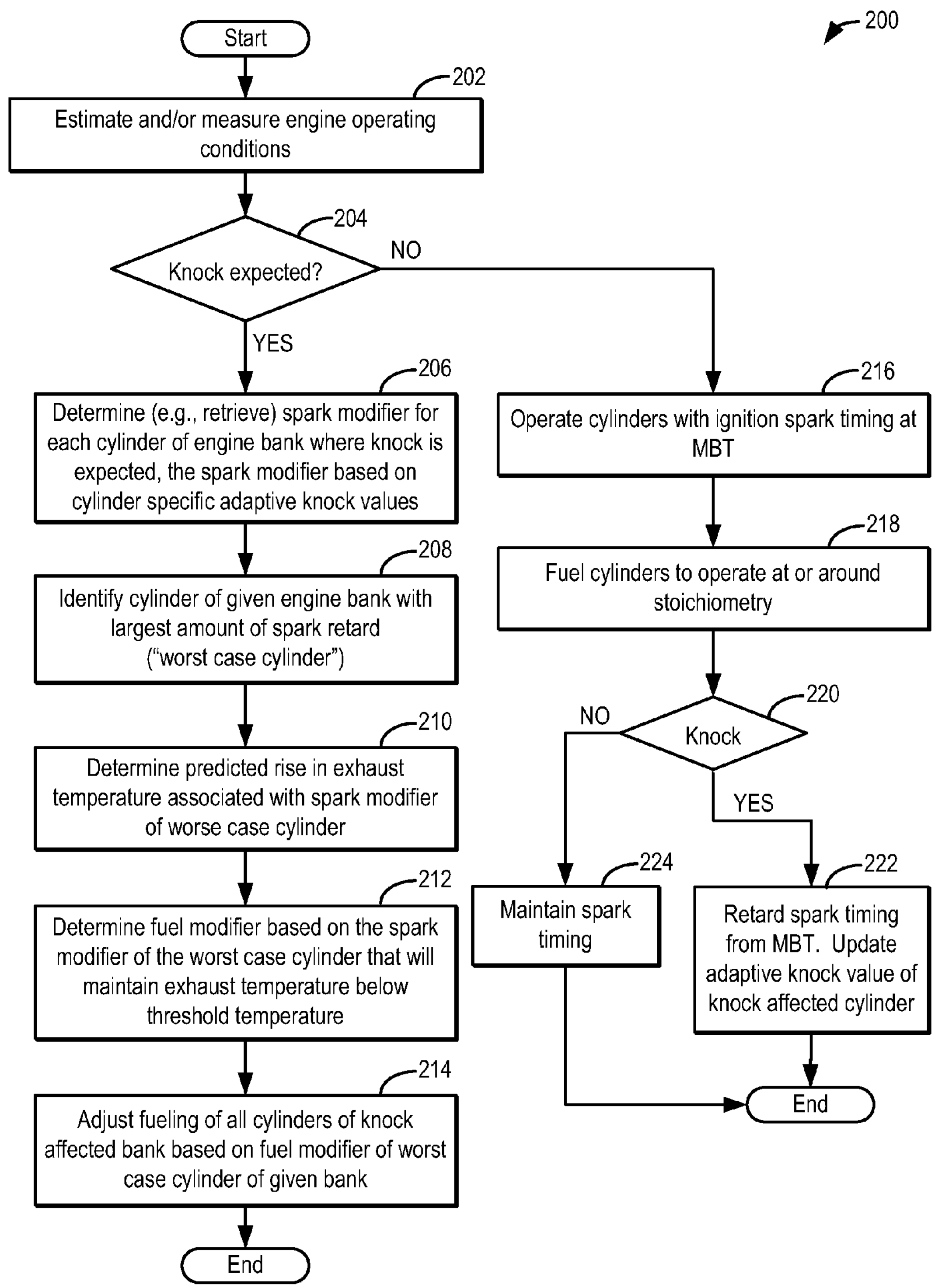
FIG. 2 shows a high level flow chart for determining cylinder-by-cylinder spark modifiers based on adaptive knock values, and further adjusting bank specific fuel modifiers based on the spark modifier of a worst case cylinder of the engine bank.

Now turning to FIG. 2, an example routine 200 is shown for differentially adjusting spark modifiers for each cylinder of an engine while commonly adjusting fuel modifiers for all cylinders of an engine based on the spark modifier of a worst case cylinder.

At 202, the routine includes estimating and/or measuring engine operating conditions. These may include, for example, engine speed, operator torque demand, engine temperature, exhaust temperature, boost, ambient conditions, etc. At 204, based at least on the estimated operating conditions, it may be determined that knock is likely to occur in an engine cylinder. For example, engine cylinders may have a higher knock propensity at higher engine speed conditions. As such, the likelihood of knock may be assessed individually for each cylinder of the engine. The likelihood of knock may be further dependent on each cylinder's individual knock history. For example, under a given set of conditions, some cylinders may have a higher propensity for knock.

If knock is not expected, at 216, the routine operates the engine cylinders with ignition spark timing at MBT. Alternatively, spark timing may be adjusted to be retarded or advanced from MBT based on the estimated operating conditions and parameters other than knock propensity. At 218, the routine includes adjusting fueling of the engine cylinder so as to operate with a combustion air-fuel ratio at or around stoichiometry. Alternatively, fueling may be adjusted to be richer than stoichiometry based on the estimated operating conditions and parameters other than knock propensity.

At 220, it may be determined if a knock event has occurred. For example, even though there may be no feed-forward indication of knock, feedback knock may be indicated based on the output of a cylinder knock sensor. If knock is not indicated, the ignition timing may be maintained (e.g., at MBT) and the routine may end. If feedback knock is indicated, at 222, spark timing of the knock affected cylinder may be retarded (e.g., from MBT). In addition, an adaptive knock value for the corresponding cylinder may be updated.

Returning to 204, if knock is expected, at 206, the routine includes determining a spark modifier or adjustment for each cylinder of the engine (or engine bank where knock is expected) based on adaptive knock control values for each cylinder. The spark adjustment may be determined on a cylinder-by-cylinder basis. The adaptive knock control values may be retrieved from a look-up table stored in the engine controller's memory. The table may have adaptive knock control values stored for each engine cylinder as a function of specific operating conditions, such as engine speed and load conditions. The adaptive knock control values may have been previously learned during cylinder operation over a plurality of drive cycles. The adaptive knock control value for each cylinder may be based on a knock history of the cylinder, the adaptive knock control value increased as a frequency of knock occurrence in the cylinder increases. The spark modifier of the cylinder may then be adjusted based on the adaptive knock control value, with spark timing in the cylinder retarded further from MBT as the adaptive knock control value of the cylinder increases. Thus, based on each cylinder's adaptive knock control value, each cylinder may be operating with a different, or uneven, amount of spark retard.

At 208, spark adjustments for each of the plurality of cylinders of the engine may be compared. The controller may then identify one (and only one) of the plurality of cylinders of the engine having a largest amount of spark retard. That is a cylinder with spark timing that is most retarded may be identified. As such, this is the cylinder with the highest propensity for knock and may also be referred to herein as the "worst case cylinder". At 210, the routine includes estimating (or predicting) an expected rise in exhaust temperature associated with the largest amount of spark retard of the worst case cylinder.

At 212, the routine includes determining a degree of richness of fueling based on the estimated rise in exhaust temperature in the worst case cylinder that will maintain the exhaust temperature below a threshold temperature. The threshold temperature may be based on a design limit of an engine component. For example, the threshold temperature may be based on one or more of an exhaust valve temperature, turbine inlet temperature, and an exhaust catalyst temperature. As such, the degree of richness required to maintain exhaust temperatures may be increased as the largest amount of spark retard in the worst case cylinder increases.

At 214, the routine includes fueling each of the plurality of cylinder of the engine based on the determined degree of richness (which is based on the spark modifier of the worst case cylinder). Specifically, the fueling of all the cylinders may be similarly adjusted and each of the plurality of cylinders may be enriched equally based on the largest amount of spark retard. Thus, while each cylinder may have spark adjusted differentially, each cylinder may be fueled with the same degree of richness.

The spark and fuel adjustments may be performed on a bank-by-bank basis, such as in a V-engine. For example, the plurality of cylinders discussed above may be coupled to a first engine bank and the engine may further include a second engine bank. Therein, knock may be expected on the first engine bank, and no knock may be expected on the second engine bank. The controller may then enrich each of the plurality of cylinders of the first bank based on the largest amount of spark retard of the worst case cylinder of the first engine bank while fueling cylinders of the second engine bank to maintain an exhaust air-fuel ratio of the second bank at or around stoichiometry, or any base commanded air-fuel ratio (such as Wide Open Pedal performance—Leanest for Best Torque (LBT). As such, the exhaust temperature of the first engine bank may be maintained below the threshold temperature independent of an exhaust temperature of the second engine bank.

In another example, wherein knock may also be expected in the second bank, the controller may also retard spark timing from MBT in each of a plurality of cylinders of the second engine bank based on individual adaptive knock control values for each of the plurality of engine cylinders. The controller may then enrich each of the plurality of cylinders of the second bank based on a largest amount of spark retard determined for one of the plurality of cylinders of the second bank (the worst case cylinder of the second bank). An example adjustment is shown with reference to FIG. 3.

It will be appreciated that while the routine of FIG. 2 shows all cylinders of the engine receiving fuel equally based on the spark modifier of the worst case cylinder, in other embodiments, the fuel modifiers of all cylinders of an engine bank may be adjusted as a function of the spark modifier of the worst case cylinder. For example, the cylinder with the largest amount of spark retard may be enriched with a degree of richness based on the given cylinder's spark modifier, and on the corresponding estimated rise in exhaust temperature to maintain an exhaust temperature of the given engine bank below a threshold temperature. At the same time, fueling of a remainder of the plurality of cylinders of the engine bank may be based on the fueling of the one of plurality of cylinders (with the largest amount of spark retard) so as to maintain an exhaust air-fuel ratio at or around stoichiometry.

In this way, cylinder-by-cylinder knock control may be achieved via spark adjustments while maintaining an exhaust temperature of an engine bank within limits via global, bank-by-bank fuel adjustments.

In one example, a method for engine knock control comprises differentially retarding spark ignition timing in a plurality of engine cylinders based on adaptive knock control values of respective cylinders; and adjusting fuel injection to each of the plurality of cylinders based on ignition timing of only one of the plurality of cylinders having a largest amount of spark retard to maintain an exhaust temperature below a threshold temperature. The fuel adjustment may include equally adjusting a degree of richness to each of the plurality of cylinders, the degree of richness proportional to the largest amount of spark retard and independent of spark retard of remaining cylinders. Herein, the plurality of engine cylinders may be included on a first engine bank. Adjusting fuel injection to maintain an exhaust temperature includes adjusting fuel injection of each of the plurality of engine cylinders of the first engine bank to maintain an exhaust temperature of the first engine bank below the threshold temperature. As such, the exhaust temperature of the first engine bank may be maintained below the threshold temperature independent of an exhaust temperature of a second, different engine bank. The threshold temperature may be based on one or more of an exhaust valve temperature, a turbine inlet temperature, and an exhaust catalyst temperature. As such, the threshold temperature may be adjusted to be within design limits of one or more engine components. Retarding spark ignition timing based on adaptive knock control values may include retarding spark ignition timing with a higher degree of spark retard in a first cylinder having a higher knock propensity while retarding spark ignition timing with a lower degree of spark retard in a second cylinder having a lower knock propensity. Adjusting the fuel injection may include enriching each of the first and second cylinders with a degree of richness based on the higher degree of spark retard in the first cylinder.

In another example, an engine system comprises a first group of cylinders on a first engine bank, a second group of cylinders on a second engine bank, a fuel injector coupled to each engine cylinder, and a spark plug coupled to each engine cylinder. The engine system further includes a controller with computer readable instructions stored on non-transitory memory for: learning adaptive knock control values for cylinder spark timing on a cylinder-by-cylinder basis based on knock occurrence in respective cylinders; differentially retarding spark timing in each engine cylinder based on respective adaptive knock values; estimating a change in exhaust temperature associated with spark adjustments in each cylinder, identifying a first cylinder in the first group of cylinders having a largest amount of spark retard on the first engine bank; identifying a second cylinder in the second group of cylinders having a largest amount of spark retard on the second engine bank; and fueling each cylinder of the first group of cylinders based on the spark retard of the first cylinder while fueling each cylinder of the second group of cylinders based on the spark retard of the second cylinder to maintain an exhaust temperature in each engine bank below a threshold temperature.

Herein, fueling each cylinder of the first group includes equally enriching each cylinder of the first group based on the spark retard of the first cylinder, while fueling each cylinder of the second group includes enriching each cylinder of the second group based on the spark retard of the second cylinder. The threshold temperature may be based on a catalyst temperature, and the adaptive knock control values may include a spark timing adjustment for a cylinder based on a feed-forward likelihood of knock in the cylinder.

Figure 3:
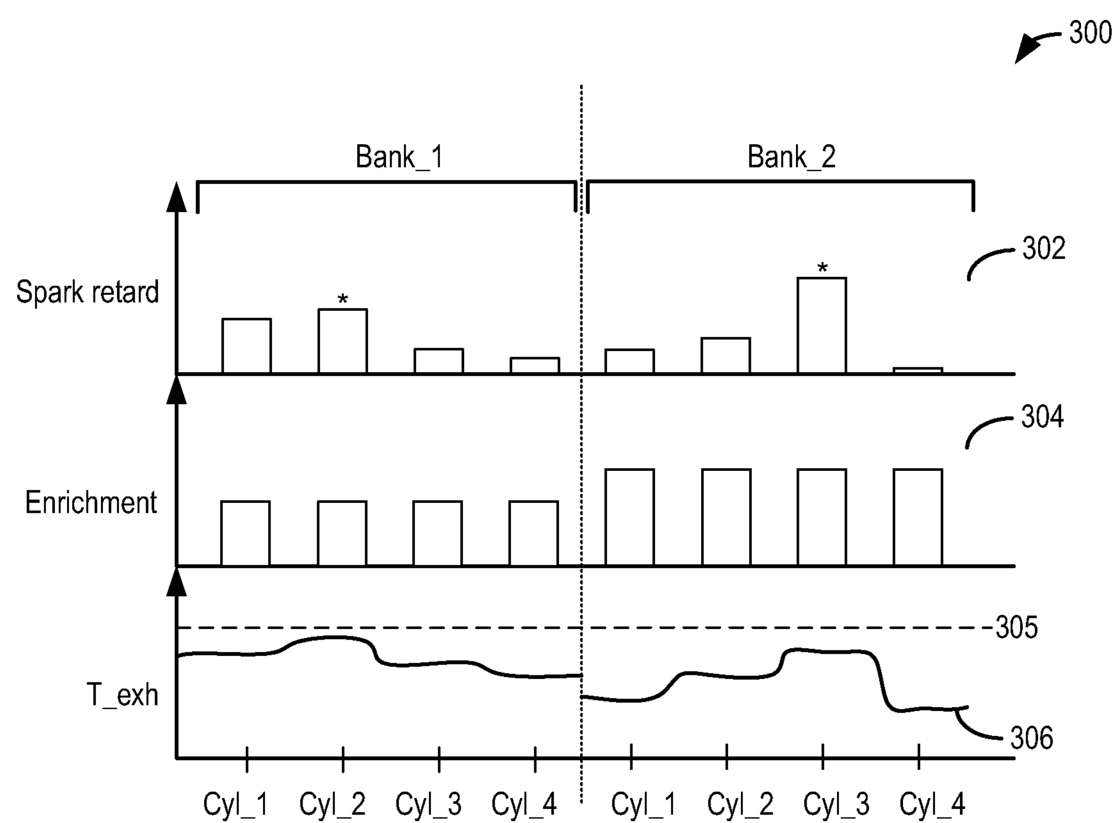
FIG. 3 shows an example of engine spark and fuel adjustment for knock and exhaust temperature control, according to the present disclosure.

Now turning to FIG. 3, an example spark and fuel adjustment for knock control is shown for a first group of cylinders (Cylinders 1-4) of a first engine bank (Bank_1) and a second group of cylinders (Cylinders 1-4) of a second engine bank (Bank_2). The spark and fuel adjustments are performed on a bank-by-bank basis so that exhaust temperatures of the banks can be maintained within component design limits. Specifically, map 300 depicts cylinder spark adjustments at plot 302, cylinder fuel adjustments at plot 304, and bank-specific exhaust temperature profiles at plot 306.

Plot 302 shows an amount of spark retard determined for each cylinder of a first engine bank and a second engine bank. As depicted, each cylinder may be operated with a different amount of spark retard. The spark retard for each cylinder may be determined based on individual cylinder adaptive knock values learned over multiple drive cycles and retrieved from a controller's memory. Cyl_2 in the first engine bank may be configured to operate with the largest amount of spark retard on the first bank and may be designated as the "worst case cylinder" of Bank_1 (as indicated via an asterisk). Likewise, Cyl_3 of the second engine bank in may be configured to operate with the largest amount of spark retard on the second bank and may be designated as the "worst case cylinder" of Bank_2 (as also indicated via an asterisk).

Plot 304 shows a fueling determined for each cylinder of the first engine bank and second engine banks. To enable the exhaust temperature (plot 306) of each bank to be maintained within threshold 305, all cylinders of the first bank are enriched with a degree of richness adjusted based on the spark retard of Cyl_2 while all cylinders of the second bank are enriched with a degree of richness adjusted based on the spark retard of Cyl_3. Thus, while the cylinders are operated with varying spark modifiers, cylinders of a given bank are operated with a common fuel modifier that is based on the spark modifier of the worst case cylinder of the given bank. As shown at plot 306, this allows for knock control while also maintaining exhaust temperatures within limits of heat-sensitive engine components.

In this way, cylinder-specific spark adjustments may be applied to address knock occurrence in individual cylinders. Then, bank-specific fuel adjustments may be applied to control exhaust temperature for the bank. By fueling (e.g., enriching) all cylinders of a bank equally based on the fueling required to address the temperature rise associated with the cylinder having the largest amount of knock-controlling spark retard, exhaust over-temperature conditions may be reduced. As such, this extends the life of engine components and improves engine performance. In addition, the bank specific fuel adjustment allows for improved fuel economy without degrading knock control.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system, comprising:

a first group of cylinders on a first engine bank;

a second group of cylinders on a second engine bank;

a fuel injector coupled to each engine cylinder, a spark plug coupled to each engine cylinder; and a controller with computer readable instructions stored on non-transitory memory for:

learning adaptive knock control values for cylinder spark timing on a cylinder-by-cylinder basis based on knock occurrence in respective cylinders;

differentially retarding spark timing in each engine cylinder based on respective adaptive knock values;

estimating a change in exhaust temperature associated with spark adjustments in each cylinder;

identifying a first cylinder in the first group of cylinders having a largest amount of spark retard on the first engine bank;

identifying a second cylinder in the second group of cylinders having a largest amount of spark retard on the second engine bank; and fueling each cylinder of the first group of cylinders based on the spark retard of the first cylinder while fueling each cylinder of the second group of cylinders based on the spark retard of the second cylinder to maintain an exhaust temperature in each engine bank below a threshold temperature.

2. The system of claim 1, wherein fueling each cylinder of the first group includes equally enriching each cylinder of the first group based on the spark retard of the first cylinder; and wherein fueling each cylinder of the second group includes enriching each cylinder of the second group based on the spark retard of the second cylinder.

3. The system of claim 1, wherein the threshold temperature is based on one or more of a catalyst temperature, an exhaust turbine inlet, and one or more exhaust valves, and wherein the adaptive knock control values include a spark timing adjustment for a cylinder based on a feed-forward likelihood of knock in the cylinder.

4. A method for an engine, comprising:

maintaining engine exhaust temperature within a threshold via each of spark and fueling adjustments, the spark adjustment based on adaptive knock control values for each of a plurality of engine cylinders, the fueling adjustment based on the spark adjustment.

5. The method of claim 4, wherein the plurality of cylinders are each operated with a different amount of spark retard from MBT.

6. The method of claim 4, wherein the fueling adjustment is a degree of enrichment, the degree adjusted for each of the plurality of cylinders responsive to an amount of spark retard of a single cylinder of the plurality cylinders being the most retarded.

7. The method of claim 4, wherein the spark adjustment includes retarding spark timing further from MBT in a cylinder as the adaptive knock control value for the cylinder increases.

8. The method of claim 4, wherein the adaptive knock control value for each cylinder is based on a knock history of the cylinder, the adaptive knock control value increased as a frequency of knock occurrence in the cylinder increases.

9. The method of claim 4, wherein the fuel adjustment based on the spark adjustment includes:

comparing spark adjustment amounts for each of the plurality of cylinders;

identifying one of the plurality of cylinders having a largest amount of spark retard; and similarly adjusting fuel injection to each of the plurality of cylinders based on the largest amount of spark retard.

10. The method of claim 9, wherein the adjusting fuel injection further includes, estimating a rise in exhaust temperature associated with the largest amount of spark retard in the one of the plurality of cylinders;

determining a degree of richness of fueling based on the estimated rise; and fueling each of the plurality of cylinders based on the determined degree of richness to maintain exhaust temperature below a threshold temperature.

11. The method of claim 10, wherein the fueling includes equally enriching each of the plurality of cylinders based on the largest amount of spark retard.

12. The method of claim 10, wherein the plurality of cylinders are coupled to a first engine bank, the engine further including a second engine bank.

13. The method of claim 12, further comprising, while enriching each of the plurality of cylinders of the first engine bank, fueling cylinders of a second bank at or around stoichiometry.

14. The method of claim 12, further comprising, retarding spark timing from MBT in each of a plurality of cylinders of the second engine bank based on adaptive knock control values for each of the plurality of engine cylinders; and enriching each of the plurality of cylinders of the second bank based on a largest amount of spark retard determined for one of the plurality of cylinders of the second bank.

15. The method of claim 10, wherein the fueling includes enriching the one of the plurality of cylinders based on the estimated rise to maintain exhaust temperature below a threshold temperature while fueling a remainder of the plurality of cylinders based on the fueling of the one of plurality of cylinders so as to maintain an exhaust air-fuel ratio at or around stoichiometry.

16. A method for an engine, comprising:

differentially retarding spark ignition timing in a plurality of engine cylinders based on adaptive knock control values of respective cylinders; and adjusting fuel injection to each of the plurality of cylinders based on ignition timing of only one of the plurality of cylinders having a largest amount of spark retard to maintain an exhaust temperature below a threshold temperature.

17. The method of claim 16, where the fuel adjustment includes equally adjusting a degree of richness to each of the plurality of cylinders, the degree of richness proportional to the largest amount of spark retard and independent of spark retard of remaining cylinders, wherein the plurality of engine cylinders are included on a first engine bank, and wherein adjusting fuel injection to maintain an exhaust temperature includes adjusting fuel injection of each of the plurality of engine cylinders of the first engine bank to maintain an exhaust temperature of the first engine bank below the threshold temperature.

18. The method of claim 17, wherein the exhaust temperature of the first engine bank is maintained below the threshold temperature independent of an exhaust temperature of a second, different engine bank.

19. The method of claim 16, wherein the threshold temperature is based on one or more of an exhaust valve temperature, a turbine inlet temperature, and an exhaust catalyst temperature.

20. The method of claim 16, wherein retarding spark ignition timing based on adaptive knock control values includes retarding spark ignition timing with a higher degree of spark retard in a first cylinder having a higher knock propensity while retarding spark ignition timing with a lower degree of spark retard in a second cylinder having a lower knock propensity, and wherein adjusting fuel injection includes enriching each of the first and second cylinder with a degree of richness based on the higher degree of spark retard in the first cylinder.

* * * * *